(12) United States Patent
Braunschädel

(10) Patent No.: US 6,279,949 B1
(45) Date of Patent: Aug. 28, 2001

(54) PROTECTIVE DEVICE COMPRISING A GAS BAG FOR MOTOR VEHICLE OCCUPANTS

(75) Inventor: Axel Braunschädel, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/561,009

(22) Filed: Apr. 28, 2000

(30) Foreign Application Priority Data

Apr. 29, 1999 (DE) .......................................... 299 07 607 U

(51) Int. Cl.$^7$ .................................................. B60R 21/28
(52) U.S. Cl. ............................................................ 280/739
(58) Field of Search .............................................. 280/739

(56) References Cited

U.S. PATENT DOCUMENTS

| | | |
|---|---|---|
| 2,834,609 | 5/1958 | Bertrand . |
| 3,747,953 | 7/1973 | Goes et al. ............................ 280/739 |
| 3,861,712 * | 1/1975 | Matsui et al. ......................... 280/739 |
| 4,964,652 | 10/1990 | Karlow ................................. 280/739 |
| 5,351,977 * | 10/1994 | Grace ................................... 280/739 |
| 5,366,242 | 11/1994 | Faigle et al. ......................... 280/739 |
| 5,709,405 * | 1/1998 | Saderholm et al. ................. 280/739 |

FOREIGN PATENT DOCUMENTS

| | | |
|---|---|---|
| 2056101 | 3/1972 | (DE) . |
| 19805308 | 8/1998 | (DE) . |
| 19731220 | 1/1999 | (DE) . |
| 2306409 | 5/1997 | (GB) . |

* cited by examiner

Primary Examiner—Kenneth R. Rice
(74) Attorney, Agent, or Firm—Tarolli, Sundheim, Covel, Tummino & Szabo L.L.P.

(57) ABSTRACT

The invention relates to a device for rapid inflation of a folded gas bag for an occupant impact protection device in motor vehicles. The device comprises a housing, a pyrotechnic propellant within the housing for generating filling gases, and an ignition device. The housing is equipped with a passage serving as an outflow duct for the filling gases from the gas bag, a cross-section of the passage being adapted to be exposed at least in part after an activation of the device.

18 Claims, 4 Drawing Sheets

PROTECTIVE DEVICE COMPRISING A GAS BAG FOR MOTOR VEHICLE OCCUPANTS

TECHNICAL FIELD

The invention relates to a device for the rapid inflating of a folded gas bag for an occupant impact protection device in motor vehicles.

BACKGROUND OF THE INVENTION

Such protective devices have become known under the name "airbag" and in the meantime are installed as standard in modern motor vehicles. Airbag modules accommodated in the steering wheel of a motor vehicle are usual and are the most widespread, which in the case of an accident are triggered by an acceleration sensor, the folded gas bag being inflated explosion-like and forming between the driver and the steering wheel a cushion by which injuries are prevented, but at least reduced. Also, corresponding airbag modules have been provided as standard in the meantime for the passenger. Further airbag modules which are matched to particular accident situations, for example to a side impact, are likewise offered as additional equipment or even already as standard.

In all airbag modules, the gas bag can only develop an optimum protective effect when it is inflated promptly in a taut manner. In the case of front airbags, promptly means for example within 20 to 30 milliseconds. To achieve this, pyrotechnic charges are generally used, which can make available the necessary gas volume as a product of chemical conversions in the manner of an explosion.

As a gas bag which is inflated in a taut manner would act like an elastically deformable spring element and would throw back the occupant who is plunging into it, in all airbag systems care must be taken that the filling gases can also flow out from the gas bag again, because only thus can a substantially plastic collision behavior be achieved with optimum decrease of kinetic energy when a vehicle occupant plunges in. For this, either the material of the gas bag casing is designed so as to be gas-permeable in a defined manner, or else with a gas bag casing which is substantially impermeable to gas, separate outflow openings are provided. In both cases, it can not be avoided that already on filling the gas bag a greater or lesser proportion of the filling gases flows off and the maximum possible filling can not be achieved with a given propellant charge. If one nevertheless wishes to achieve a particular filling level, the propellant charge must be designed to be larger so that the quantity of filling gast to be regarded as loss, which flows off until the occupant plunges in, can be compensated.

From this, the problem results of improving the device initially mentioned to the effect that on the one hand a gas bag, which is filled in a taut manner, can be made available and that on the other hand no losses of filling gases occur and the filling volume which is aimed for is achieved with the smallest possible quantity of propellant.

BRIEF SUMMARY OF THE INVENTION

The invention provides an inflation device in which the problem mentioned above is solved. This is achieved in a device for rapid inflation of a folded gas bag for an occupant impact protection device in motor vehicles which comprises a housing, a pyrotechnic propellant within the housing for generating filling gases, and an ignition device. The housing is equipped with a passage serving as an outflow duct for the filling gases from the gas bag, a cross-section of the passage being adapted to be exposed at least in part after an activation of the device.

With the passage, initially closed and then exposed in whole or in part, in the housing to receive the pyrotechnic propellant, it is possible to coordinate the start of the outflow of the filling gases from the gas bag chronologically with the plunging of the occupant into the gas bag. In combination with a gas bag casing which is impermeable to gas, thereby a premature outflow of gas can be avoided, so that no gas losses occur and no excess propellant is required.

According to an advantageous further development of the basic idea, provision is made that the passage is closed by a rupture membrane with a defined strength. Thereby, the chronological coordination of the start of outflow which is aimed for with the plunging of the occupant can be realized in a simple manner in that the strength of the rupture membrane is coordinated with the sudden rise in pressure occurring on plunging. The outflow is therefore triggered immediately by the plunging in. Between reaching the maximum gas bag filling and the plunging of the occupant, the gas bag which is filled in a taut state is. held as it were "in store" and the outflow of the filling gases for achieving the plastic impact- or collision behavior only begins when the compliance of the gas bag is required.

According to another advantageous further development of the basic idea, provision is made that the passage is closed by an actuator and that the passage, after an activation of the device, can be opened by the actuator at least in part as a function of at least one measured value. This somewhat more complicated version not only permits the chronological coordination of the start of outflow and the plunging process but also the establishing of the outflow cross-section and hence an influence on the energy absorption behavior of the gas bag as a function of at least one measured value. This can for example be the body weight of the occupant concerned, which can be easily determined by means of a suitable measurement transducer in the vehicle seat and can be passed on to the electronic control device for the gas bag. As is known, a heavy person requires a harder gas bag than a light person, because on plunging in, a higher kinetic energy has to be taken up. The hardness of the gas bag is determined primarily by the gas outflow rate. With a small outflow rate, a hard gas bag can be realized which is necessary for the optimum protection for heavy people. Vice versa, a soft gas bag can be realized with a high outflow rate, which then offers an optimum accident protection to light people.

Of course, other measured occupant specific, vehicle specific and crash specific values, such as for example amount and direction of the vehicle deceleration caused by an accident can also be taken into account for establishing the size of the outflow cross-section.

DETAILED DESCRIPTION OF PREFERRED EMBODIMENTS

Figure 1:
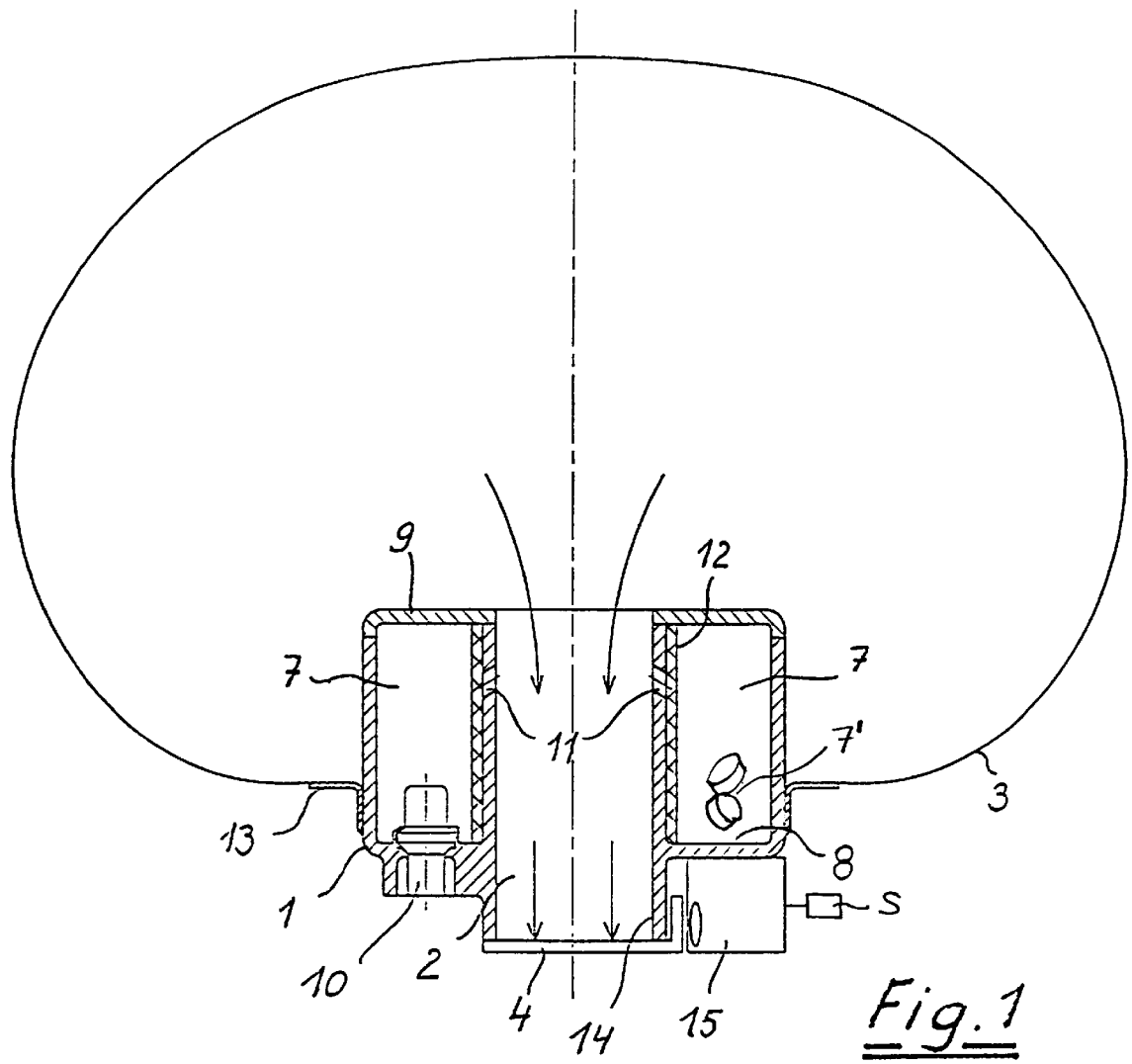
FIG. 1 shows a first embodiment of the device according to the invention, in section.

In the embodiment of the device according to FIG. 1, the housing 1 is equipped, for receiving a pyrotechnic propellant identified by 7' and an ignition device 10, with an annular space 7 of circular cylindrical shape, which has in the base region 8 a receiving bore for an ignition device 10 and which is closed by a cover 9. The housing 1 has an externally surrounding mounting flange 13, on which a gas bag 3 is fastened which is only illustrated schematically. The annular space 7 is in practice filled with the pyrotechnic propellant 7a, which can be ignited by the ignition device as required and delivers the gaseous combustion products which are necessary for filling the gas bag 3. These can flow through gas outlet openings 11 into the outflow duct 2 and from there into the gas bag 3. The gas outlet openings 11 are covered in the illustrated example embodiment by screen-like retainer devices 12 arranged upstream, which prevent solid particles from being able to penetrate into the gas bag 3 through the gas outlet openings 11. In addition, thereby a portion of the heat can be withdrawn from the gas, so that the material of the gas bag is less thermally stressed. On filling of the gas bag 3, the outflow duct 2 is firstly closed at its end away from the gas bag by an actuator comprised of slide valve 4 and actuating drive, the slide valve lying against an extension 14 projecting downwards over the base region 8 of the housing 1. To move the slide valve 4 into a defined opening position, a pyrotechnic adjustment drive 15 is provided, which can be activated taking into account occupant specific, vehicle specific and crash specific values measured by sensors S associated with the device, so that the flow cross-section of the outflow duct 2 is adjustable according to requirements. The outflow duct 2 forms a passage for the gas flowing out from the gas bag.

Figure 2:
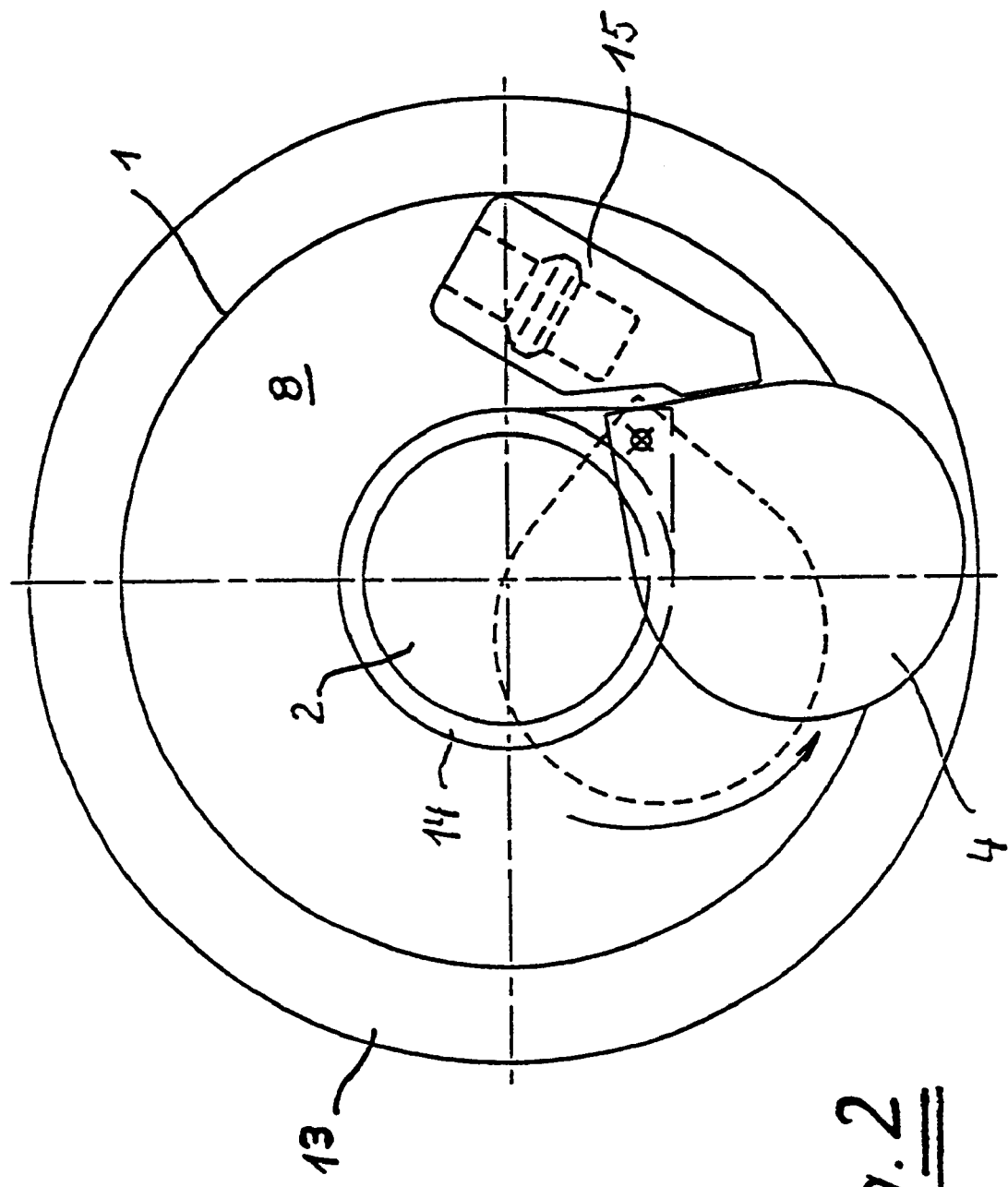
FIG. 2 shows a view onto the underside of the embodiment according to FIG. 1.
Figure 6:
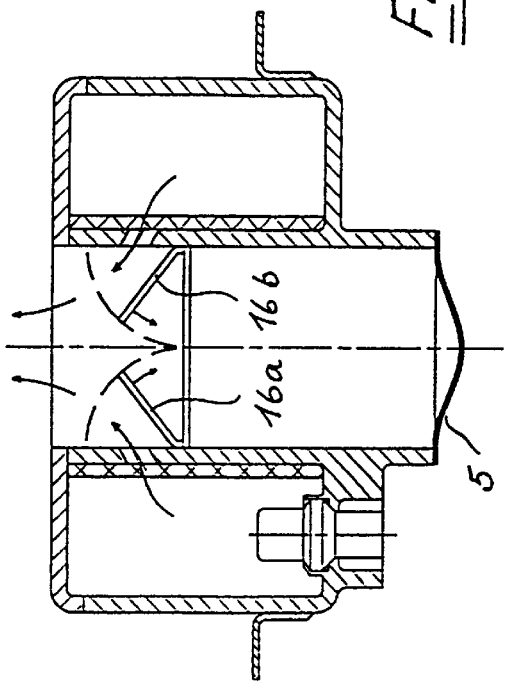
FIG. 6 shows an embodiment similar to FIG. 1, with elastically restorable flaps.

FIG. 2 shows a view of the embodiment according to FIG. 1 from below in a somewhat enlarged illustration and without gas bag. The base region 8 of the housing 1 can be seen and also the externally surrounding mounting flange 13. The outflow duct 2 ends in the downwardly projecting extension 14 and can be opened in whole or in part by the slide valve 4. The pyrotechnic adjustment drive 14 is provided for adjusting the slide valve 4. Also an electromotive actuating drive 15a can be used for adjusting the slide valve 4, as is shown in FIG. 6.

Figure 3:
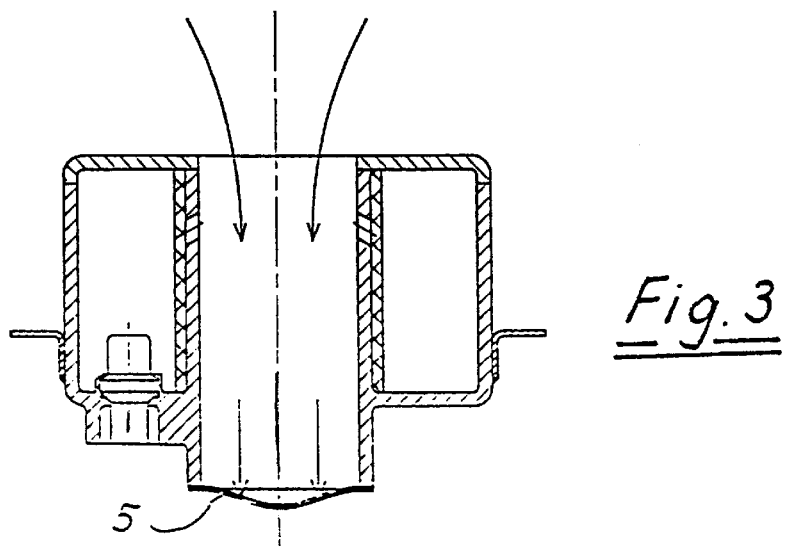
FIG. 3 shows an embodiment with rupture disc.

In the embodiment according to FIG. 3, the outflow duct 2 is closed by a rupture membrane 5, which tears on an activation of the device. This rupture membrane 5 is designed in its strength such that it tears on a given pressure in the gas bag 3 and hence exposes the flow duct 2. Otherwise, the embodiment of FIG. 3 corresponds to that of FIG. 1, so that further reference numbers and explanations are superfluous.

Figure 4:
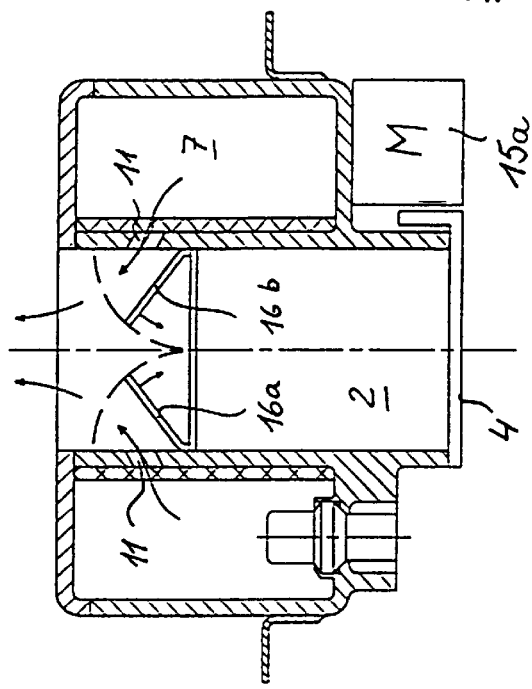
FIG. 4 shows an embodiment with two combustion chambers.

The embodiment according to FIG. 4 differs from that according to FIG. 1 in that the annular space 7 is divided into two combustion chambers 7a, 7b with associated ignition devices 10a, 10b and also gas outlet openings 11a, 11b. This embodiment can be equipped both with a slide valve 4 and also with a rupture membrane 5.

Figure 5:
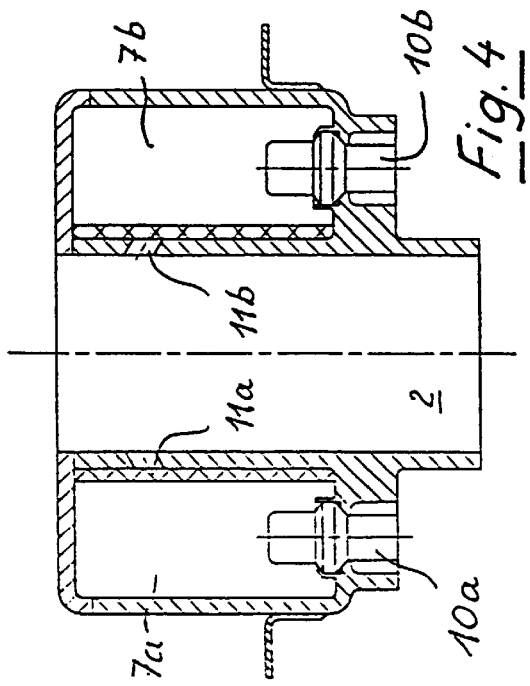
FIG. 5 shows an embodiment with diffuser.

The embodiment according to FIG. 5 differs from that according to FIG. 1 in that the outflow duct 2 is equipped with a diffuser 6 at its end facing the gas bag. Such diffusers are known and serve for the deflection and distribution of the emerging gas stream, in order to avoid a direct striking of the gas stream onto the gas bag material and being able to influence the unfolding of the gas bag. This embodiment can also be equipped with a slide valve 4 or a rupture membrane 5.

Figure 7:
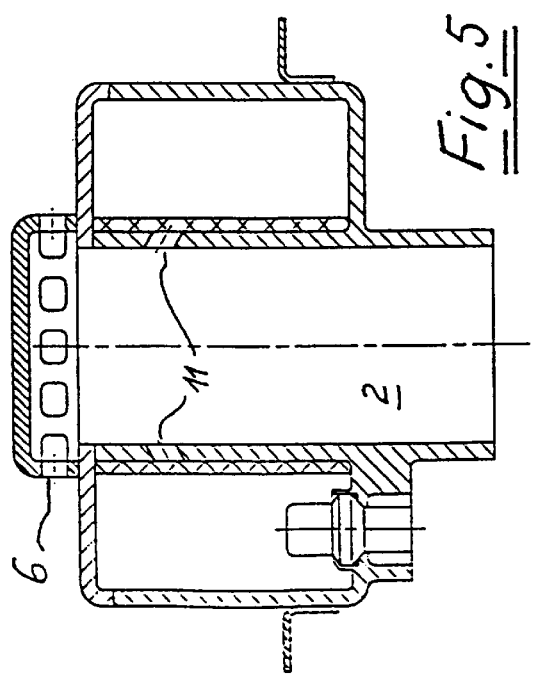
FIG. 7 shows an embodiment according to FIG. 3 with elastically restorable flaps.

In the embodiments with slide valve 4 and pyrotechnic or electromotive adjustment drive 15, 15a (FIGS. 1 and 6, respectively) or with rupture membrane 5 (FIG. 7), flaps 16a, 16b may be additionally arranged in the outflow duct 2 and may be pivotally mounted on the side wall limiting the duct 2. These flaps act as a closure device in the nature of a non-return valve and, on ignition of the pyrotechnic charge, are turned around elastically through 90° by the outflowing gases and in so doing close the outflow duct 2 substantially as long as gaseous combustion products still emerge through the gas outlet openings 11. After termination of the outflow, the flaps automatically swivel back into their initial position and thereby completely free the flow cross-section of the outflow duct 2 again.

Figure 8:
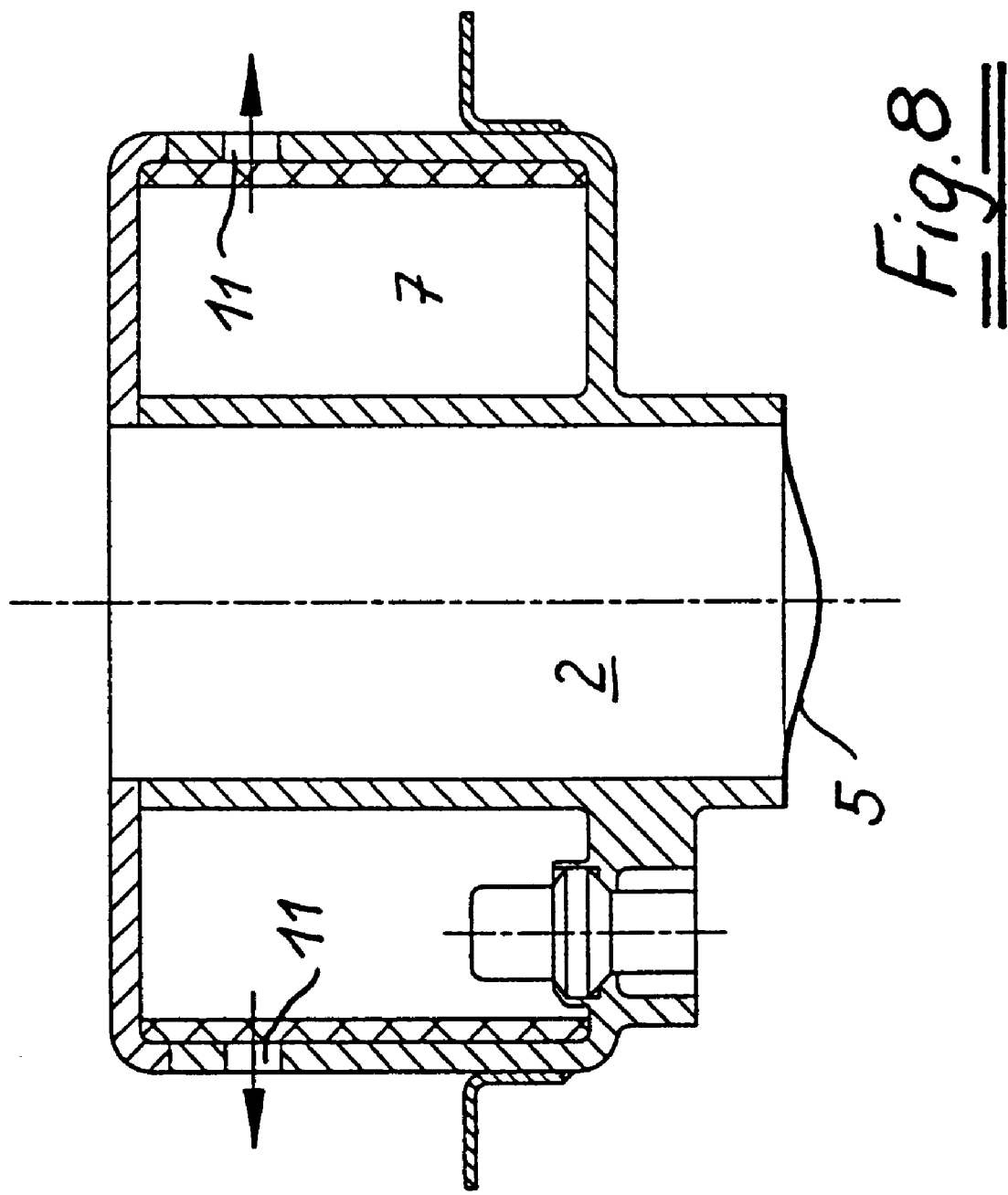
FIG. 8 shows an embodiment according to FIG. 3, however with gas outlet openings leading outwards.

FIG. 8 shows an embodiment in which the gas outlet openings 11 are not directing towards the inside of the outflow duct 2 but rather outwards toward the space above the mounting flange 13. In this way, pressure peaks on ignition of the charge can be kept away from the rupture membrane 5 and a premature destruction thereof can be avoided.

What is claimed is:

1. A device for rapid inflation of a folded gas bag for an occupant impact protection device in motor vehicles, said device comprising:
   a housing,
   a pyrotechnic propellant within said housing for generating filling gases,
   an ignition device,
   said housing being equipped with a passage serving as an outflow duct for said filling gases from said gas bag, a cross-section of said passage being adapted to be exposed at least in part after an activation of said device,
   an actuator by means of which said passage is closed, said passage, after an activation of said device, being able to be opened by said actuator at least in part as a function of at least one of occupant specific, vehicle specific and crash specific values, and
   said actuator comprising a slide valve and an actuating drive in the form of a pyrotechnic actuating drive.

2. The device according to claim 1, wherein a rupture membrane having a defined strength is provided, said passage being closed by said rupture membrane.

3. The device according to claim 1, wherein said housing is constructed in a ring shape and wherein a central outflow duct is provided as said passage.

4. The device according to claim 1, wherein said housing has an externally surrounding flange for fastening said gas bag.

5. The device according to claim 1, wherein said housing defines a cylindrical annular space with a base region and a cover region.

6. The device according to claim 5, wherein said cylindrical annular space has a plurality of gas outlet openings.

7. The device according to claim 6, wherein said outflow duct comprises an end facing said gas bag, said gas outlet openings opening into said end.

8. The device according to claim 7, wherein an externally surrounding flange is provided and wherein said gas outlet openings are arranged in an outer wall of said cylindrical annular space and above said externally surrounding flange.

9. The device according to claim 5, wherein in said base region of said housing at least one receiving bore is provided for an ignition device.

10. The device according to claim 5, wherein said outflow duct has an end facing away from said gas bag, said end forming an extension projecting over said base region of said housing.

11. The device according to claim 1, wherein said housing is divided into at least two combustion chambers which have associated ignition devices and gas outlet openings.

12. A device for a rapid inflation of a folded gas bag for an occupant impact protection device in motor vehicles, said device comprising:

a housing, a pyrotechnic propellant within said housing for generating filling gases, an ignition device, said housing being equipped with a passage serving as an outflow duct for said filling gases from said gas bag, a cross-section of said passage being adapted to be exposed at least in part after an activation of said device, a rupture membrane having a defined strength closing said passage, a closure device arranged upstream of said rupture membrane, said closure device during filling of said gas bag being closed by a pressure of said pyrotechnic filling gases against a restoring force and opening automatically after termination of a filling process.

13. The device according to claim 12, wherein said passage has a rectangular cross-section and wherein two elastically restorable flaps, pivotally mounted on a side wall of said passage, are provided as said closure device.

14. A device for rapid inflation of a folded gas bag for an occupant impact protection device in motor vehicles, said device comprising:

a housing, a pyrotechnic propellant within said housing for generating filling gases, an ignition device, said housing being equipped with a passage serving as an outflow duct for said filling gases from said gas bag, a cross-section of said passage being adapted to be exposed at least in part after an activation of said device, an actuator by means of which said passage is closed, said passage, after an activation of said device, being able to be opened by said actuator at least in part as a function of at least one of occupant specific, vehicle specific and crash specific values, a closure device arranged upstream of said actuator, said closure device during filling of said gas bag being closed by a pressure of said pyrotechnic filling gases against a restoring force and opening automatically after termination of a filling process.

15. The device according to claim 14, wherein said passage has a rectangular cross-section and wherein two elastically restorable flaps, pivotally mounted on a side wall of said passage, are provided as said closure device.

16. A device for rapid inflation of a folded gas bag for an occupant impact protection device in motor vehicles, said device comprising;

a housing, a pyrotechnic propellant within said housing for generating filling gases, an ignition device, said housing being equipped with a passage serving as an outflow duct for said filling gases from said gas bag, a cross-section of said passage being adapted to be exposed at least in part after an activation of said device, said housing defining a cylindrical annular space with a base region and a cover region, said cylindrical annular space having a plurality of gas outlet openings which are constructed so as to be running obliquely upwards toward said gas bag and wherein a screen-like retainer device is arranged upstream of them.

17. The device according to claim 16, wherein an electromotive actuating drive is provided.

18. A device for rapid inflation of a folded gas bag for an occupant impact protection device in motor vehicles, said device comprising:

a housing, a pyrotechnic propellant within said housing for generating filling gases, an ignition device, said housing being equipped with a passage serving as an outflow duct for said filling gases from said gas bag, a cross-section of said passage being adapted to be exposed at least in part after an activation of said device, said passage being defined by an outflow duct having an end facing said gas bag which end is equipped with a diffuser.

* * * * *